July 12, 1927.
W. F. AMBERG
1,635,807
MEANS FOR SHEARING TUBULAR MEMBERS
Filed Jan. 19, 1924      10 Sheets-Sheet 6
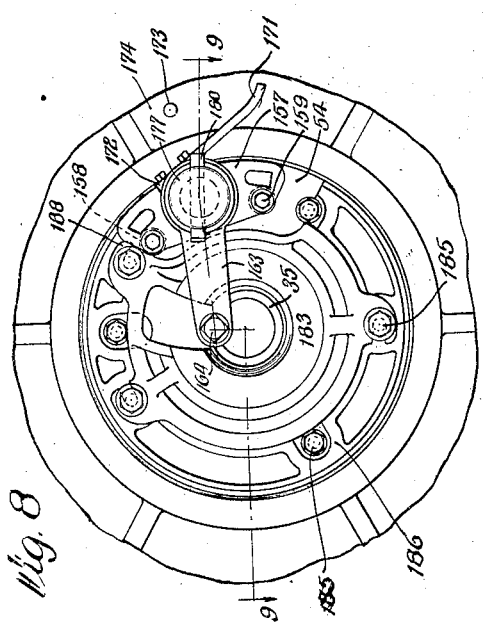
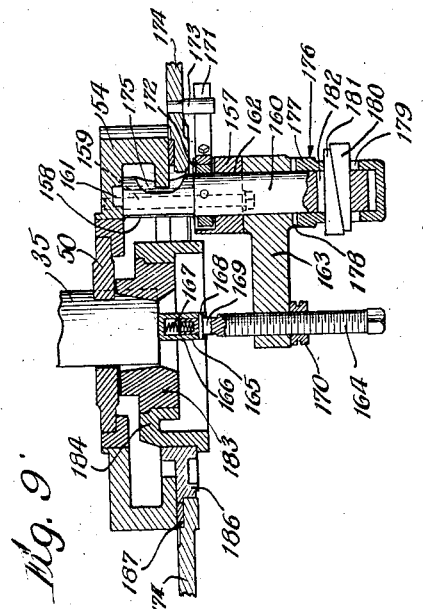
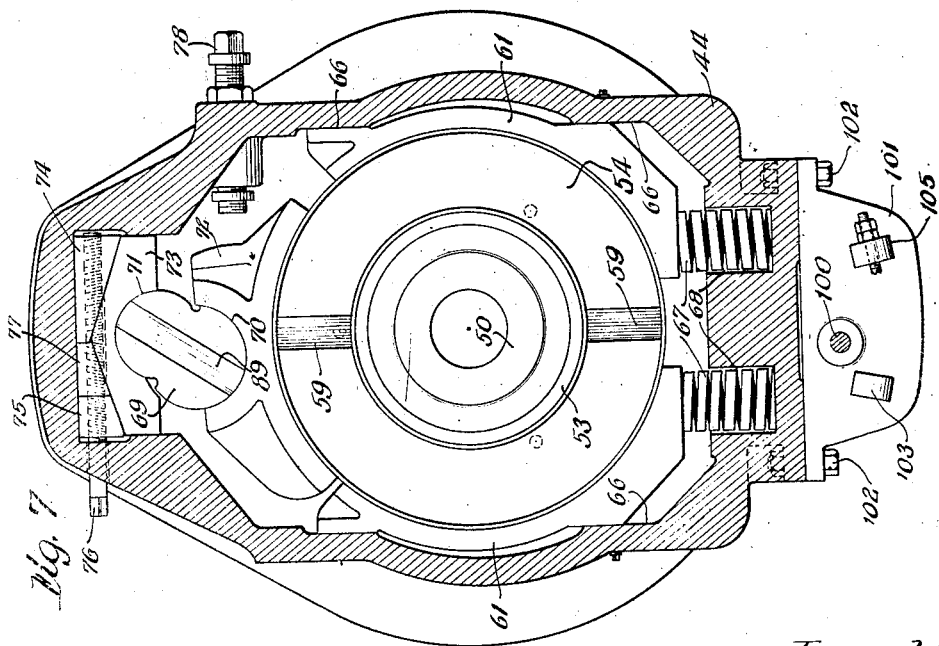

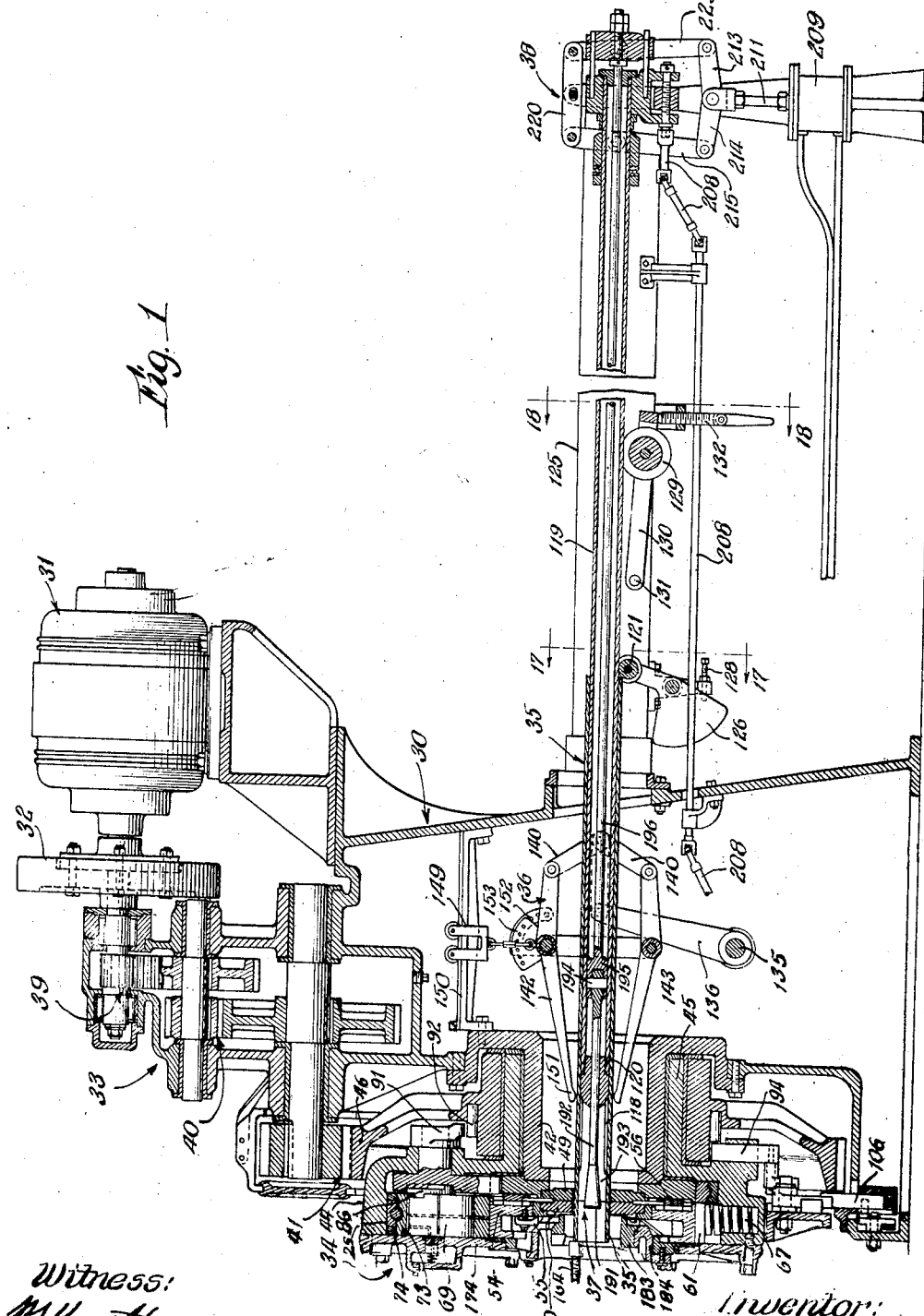

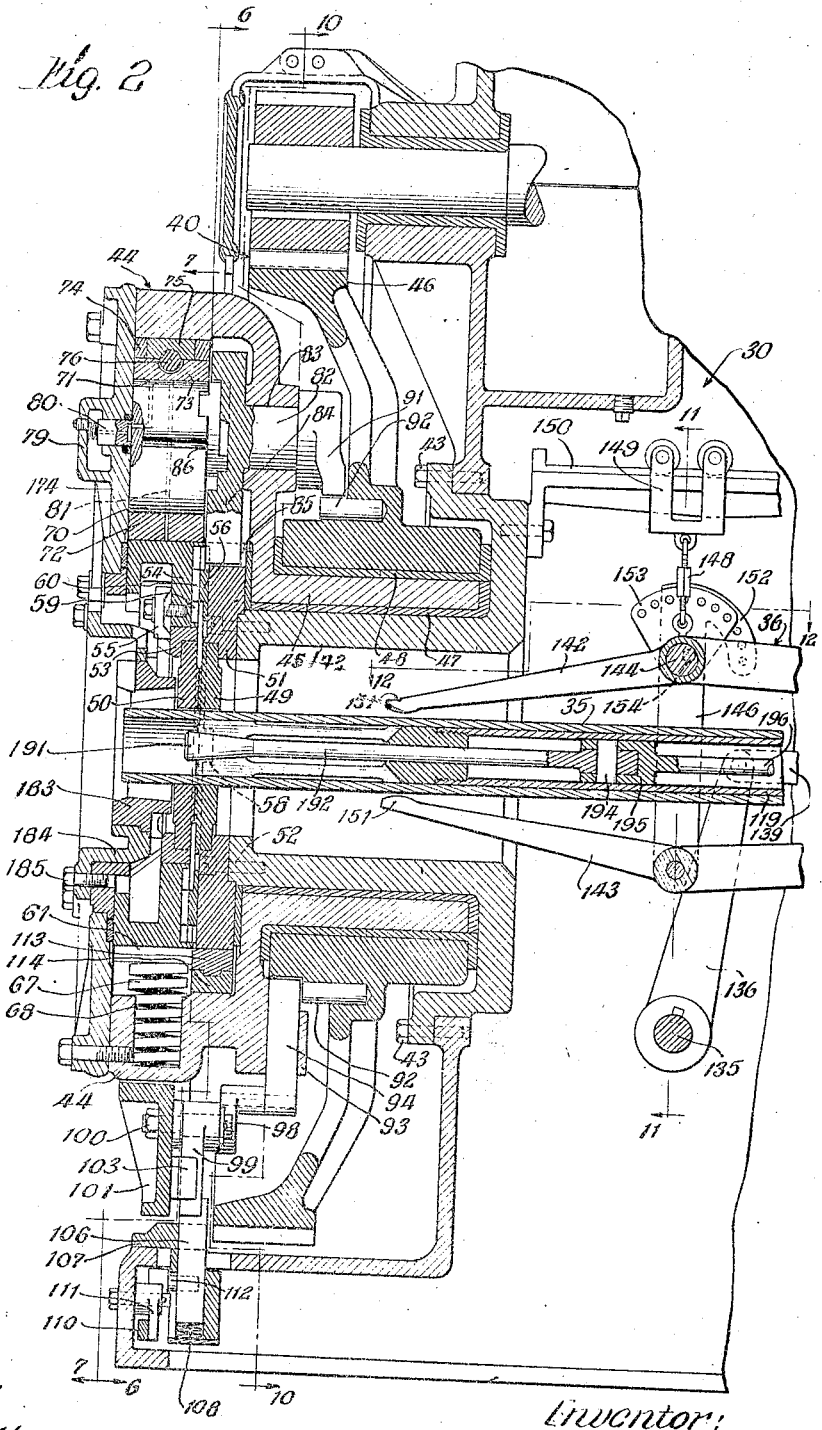

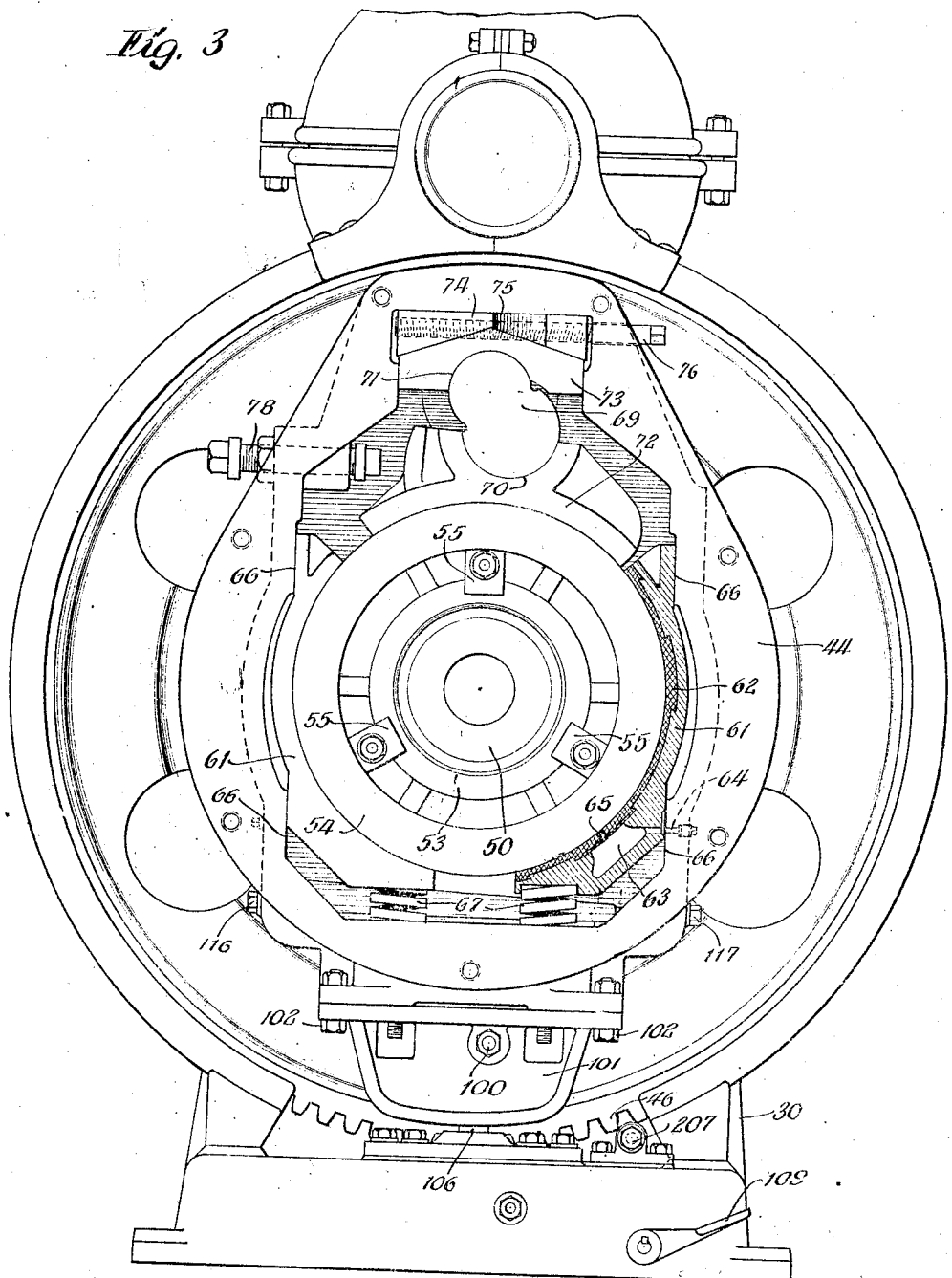

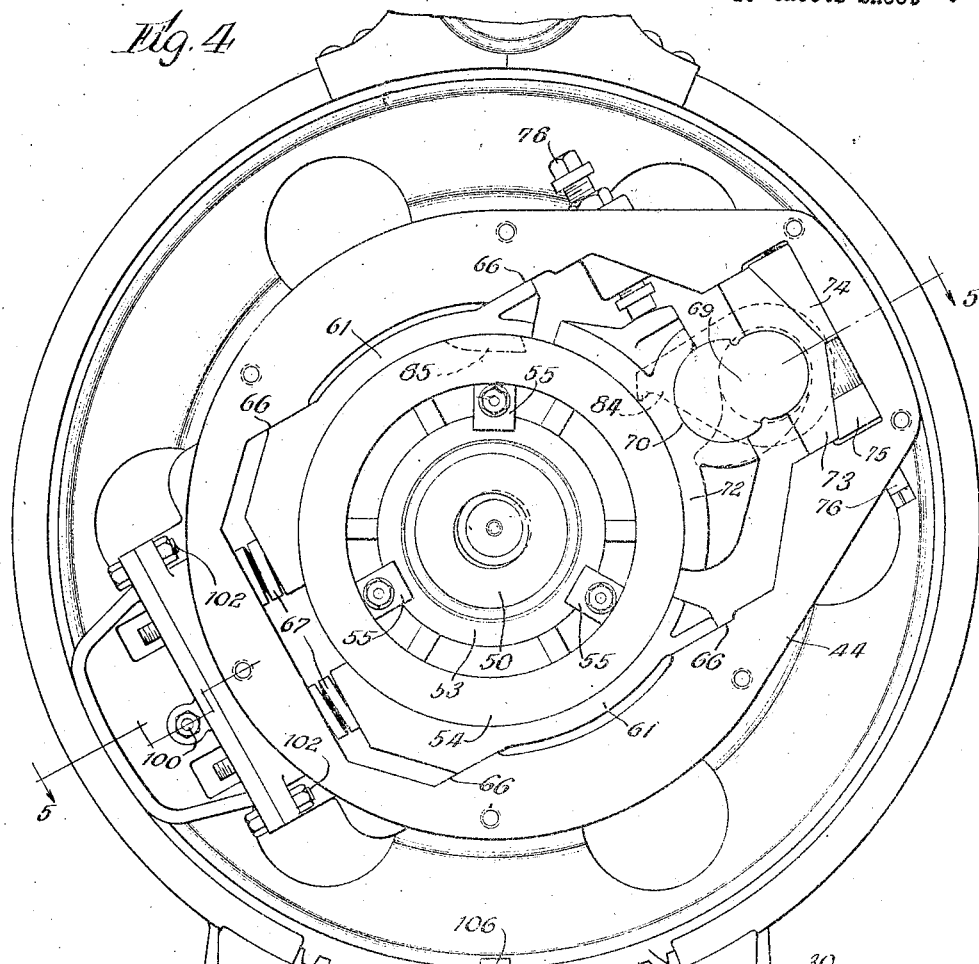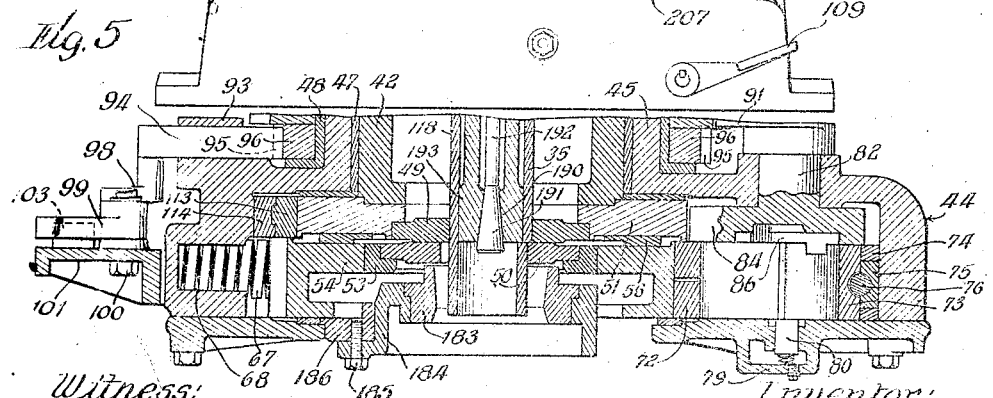

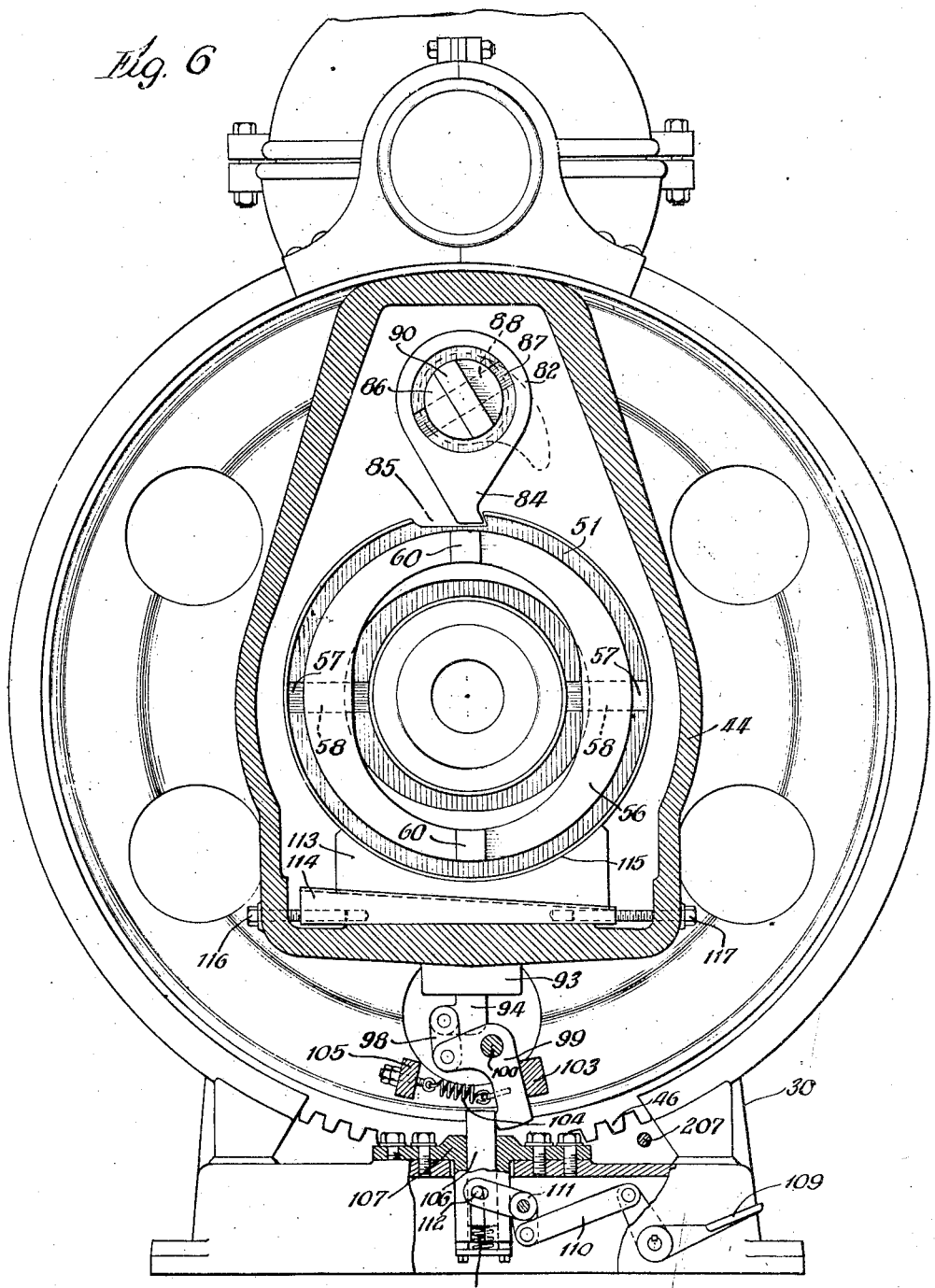

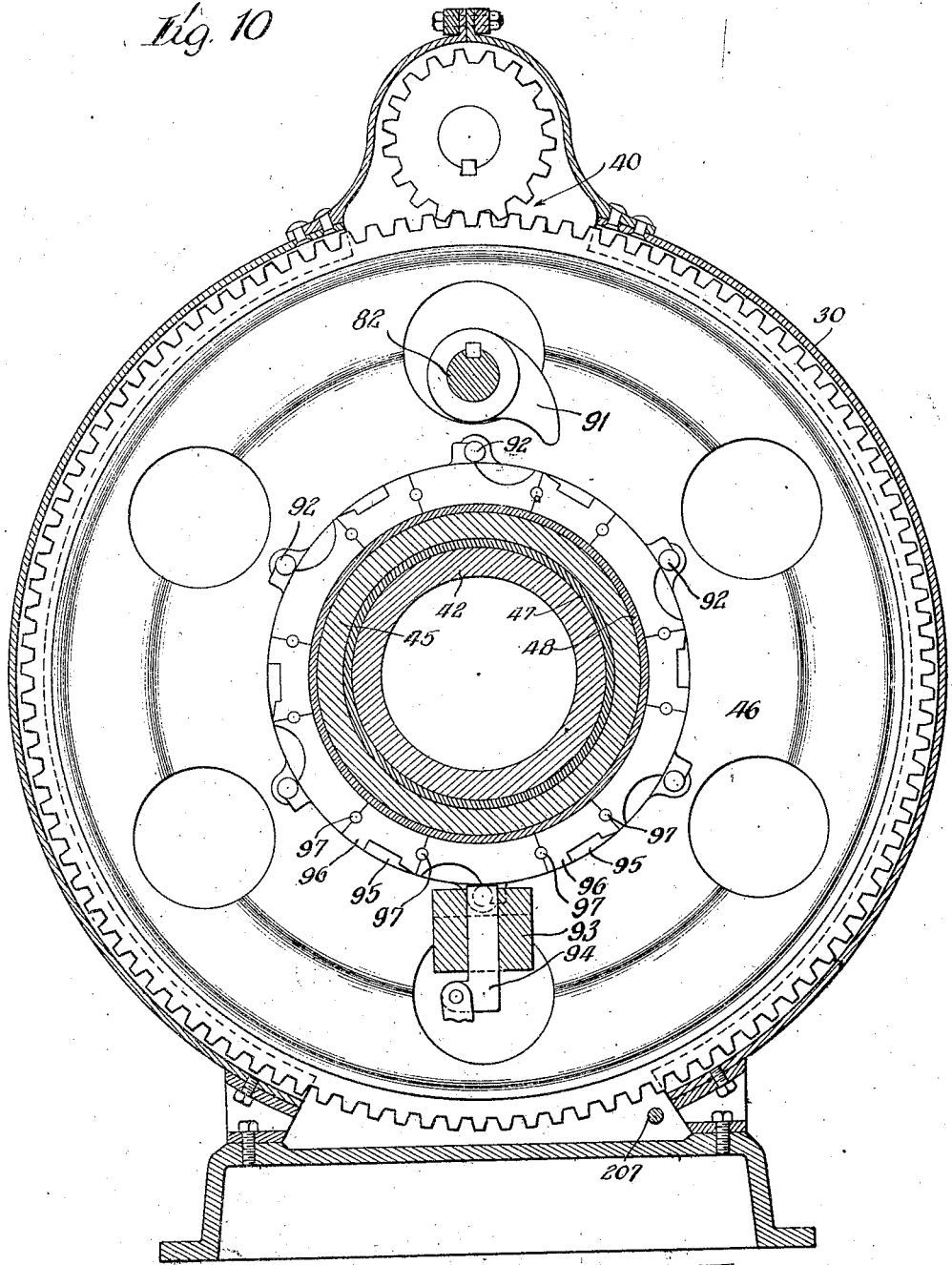

July 12, 1927.
W. F. AMBERG
1,635,807
MEANS FOR SHEARING TUBULAR MEMBERS
Filed Jan. 19, 1924   10 Sheets-Sheet 8
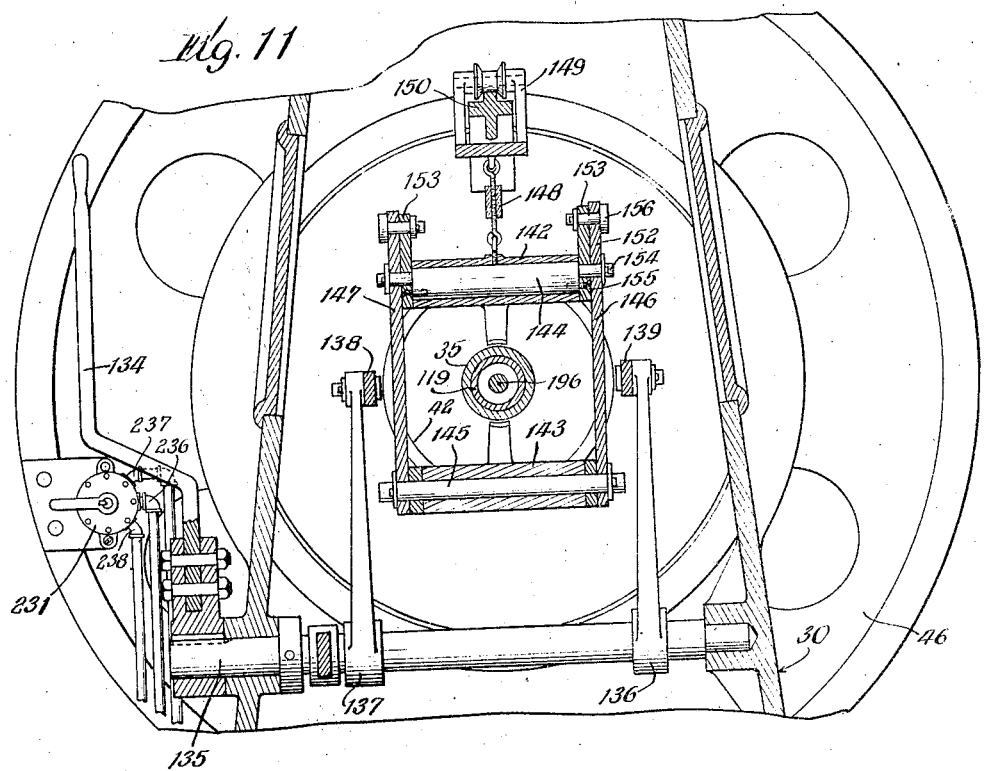
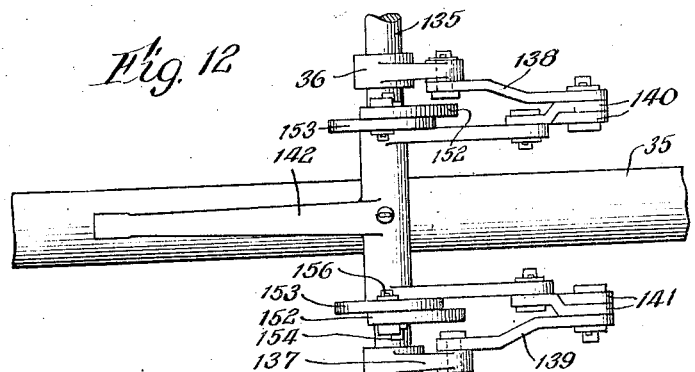
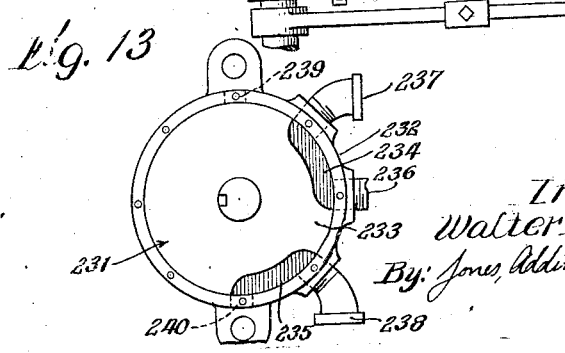
Witness:
PJ Haselton
Inventor:
Walter F. Amberg.
By: Jones, Addington, Ames & Seibold
Attys

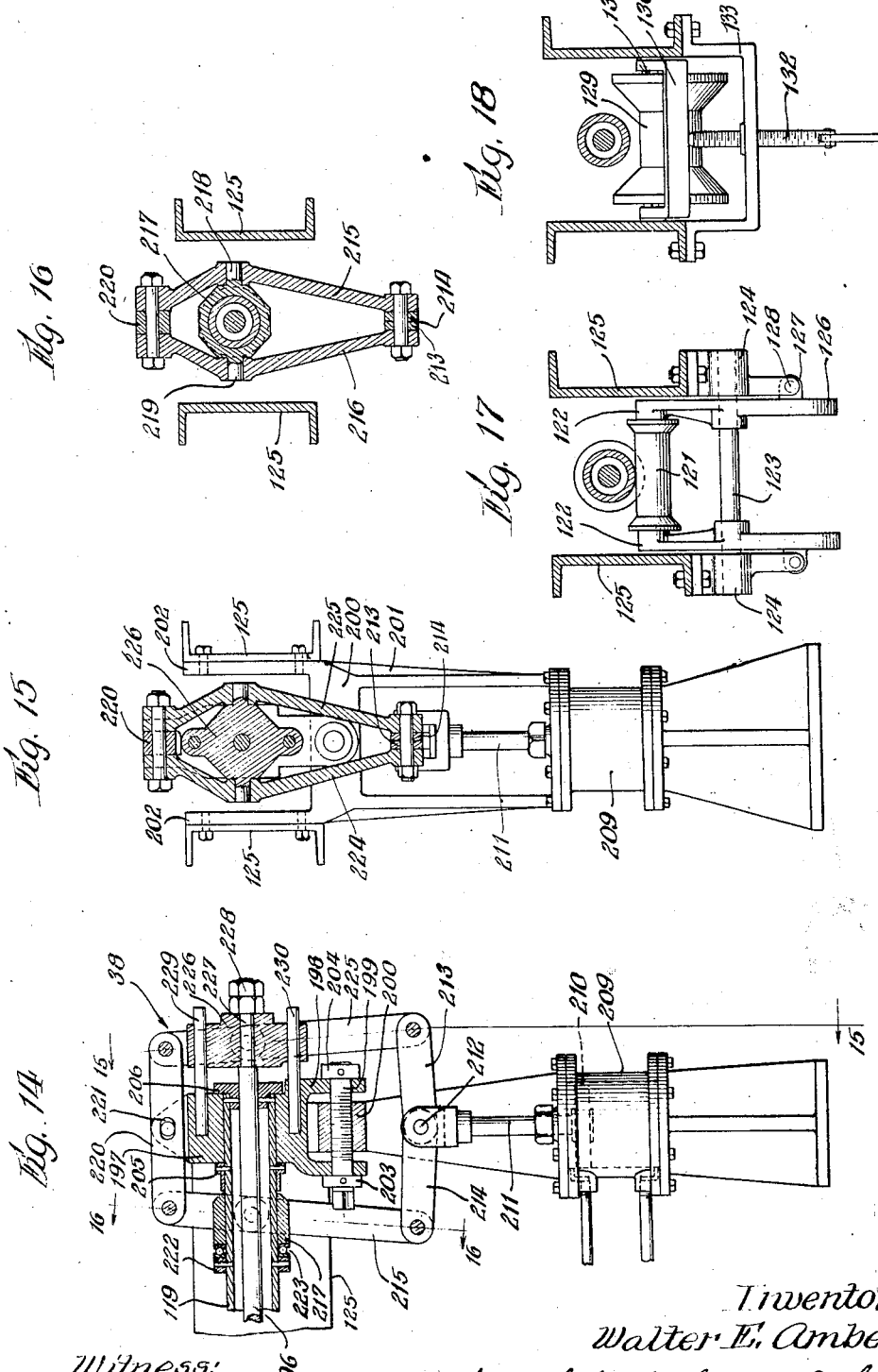

July 12, 1927.
W. F. AMBERG
1,635,807
MEANS FOR SHEARING TUBULAR MEMBERS
Filed Jan. 19, 1924    10 Sheets-Sheet 10
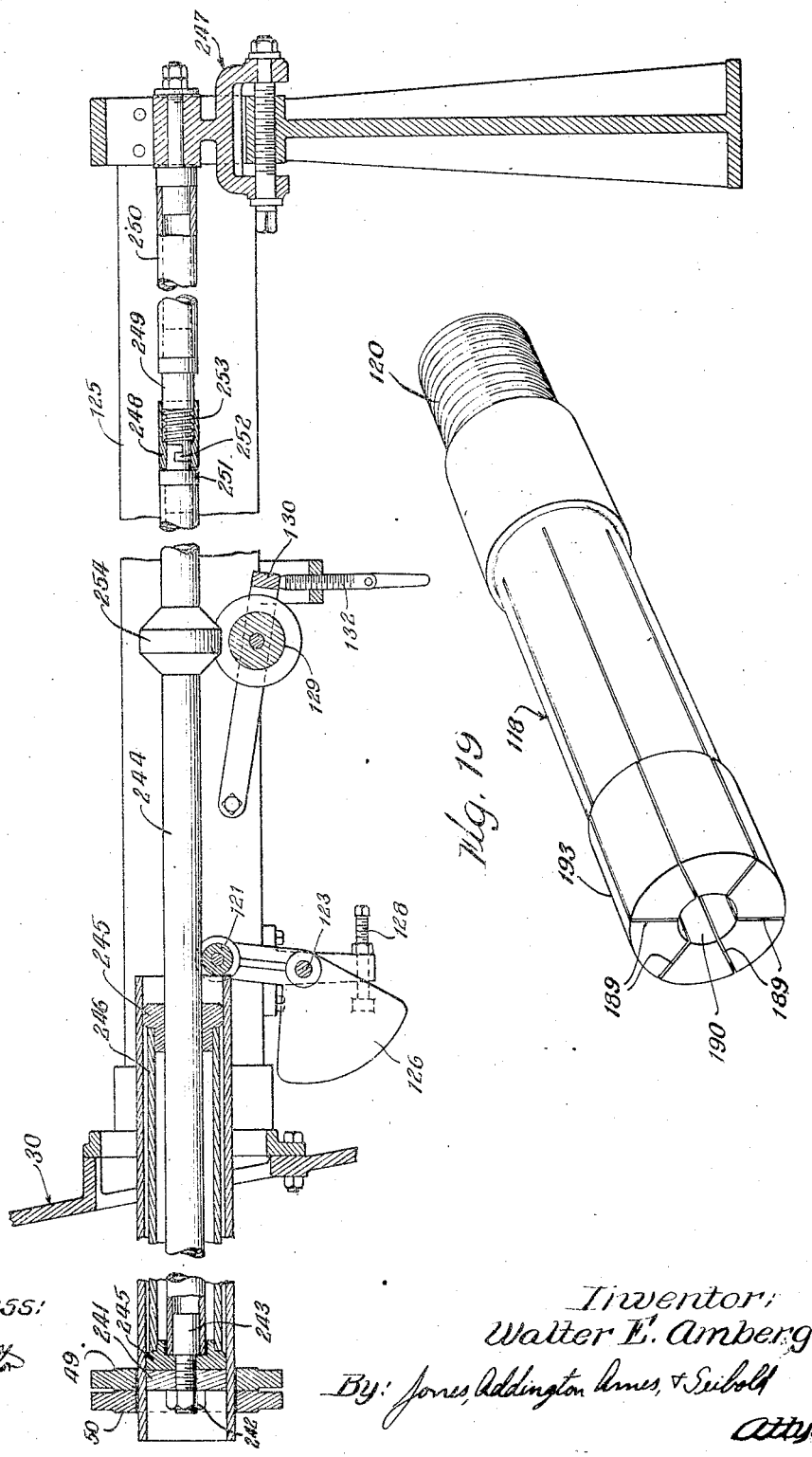

Patented July 12, 1927.

1,635,807

UNITED STATES PATENT OFFICE.

WALTER E. AMBERG, OF CHICAGO, ILLINOIS, ASSIGNOR TO WILLIAM O. PETERSON AND BERNARD L. ENGELKE, BOTH OF CHICAGO, ILLINOIS.

MEANS FOR SHEARING TUBULAR MEMBERS.

Application filed January 19, 1924. Serial No. 687,321.

My invention, which is a continuation in part of my application Serial No. 378,148, filed May 1, 1920, relates to machines by means of which tubular members may be transversely sheared along planes or lines of saparation without wasting any of the metal or other material of which the tubular members may be composed.

Moreover, my invention pertains to means for transversely shearing the walls of tubular members, such as metal pipes and the like, whereby the adjacent and opposed surfaces of separation between the severed portions of the walls of the tubular member are smooth and even and lie on substantially the same plane surface, thereby producing a "clean" cut.

In the art of metal working, it has heretofore been substantially impossible to transversely shear a tube, and particularly a circular metal tube, along a plane or line of separation. This difficulty is particularly met with when endeavoring to sever a circular tubular member along a predetermined circumference and with smooth and even surfaces of separation—which difficulty is greatly increased when endeavoring to shear without distortion, a thin-walled tubular member, such as a standard pipe provided with a thin wall but having a relatively large diameter. Of course, it is well known that tubular members, generally circular tubular members, may be severed, without distorting the wall, by placing them in a lathe and operating upon them with a cutting-lathe tool. In this instance, tubular members are severed in twain by removing the metal comprised in a "cylinder of separation" in lieu of severing them, by a "clean" cut, along a "circumference of separation" and without removing and wasting any of the material, such as I accomplish by my present invention. In the art of metal working, the foregoing method of severing a tube by means of operating upon it with a lathe cutting tool is known as "cutting."

The term "shearing" in the art of metal working is universally recognized as indicating that the material being operated upon is severed as the result of overcoming the molecular adhesion of the adjacent particles constituting the material. Shearing, therefore, is accomplished by fracturing the member being operated upon. In addition thereto, the term "shearing" implies that the separation of the material constituting the member being severed is accomplished without removing any of such material to effect separation. By means of my invention such a fracture which is designated in the art as "shearing," may be accomplished, without any resultant distortion, along an even and plane surface that is indicative of the line of separation, thereby resulting in the production of a "clean" cut.

An object of my invention is to provide means for shearing the wall of a tubular member without distortion which will effect an even and regular separation thereof along a line of separation or, if a circular tubular member, along a circumference of separation, without removing any of the material of which said member may be composed. Moreover, the shearing of the tubular member is effected along a plane surface whereby the adjacent and opposed surfaces of the severed portions of the tubular member are regular and smooth thereby indicating a "clean" cut. My present invention is particularly adapted to sever circular tubular members having thin walls and of relatively large diameters, but it is to be understood that my present invention is not limited to operate on tubular members having these characteristics only.

Another object of my invention is to provide means for shearing tubular members in twain, and particularly metallic circular tubular members, in an economical and expeditious manner without wasting the material or distorting the walls which constitute the tube. It is to be understood that, at all times, I secure a "clean" cut as long as the elements comprising my machine are maintained in such a state of repair as is required of all machine tools. By means of the machine of my present invention, which I have herein shown and described, many different sizes and types of tubular members having walls of various thicknesses and of a variety of diameters may be operated upon without requiring any extensive adjustments or the exercise of more than ordinary supervision and skill.

Again, by my present invention I am able to shear tubular members and particularly metal pipes and the like, along predetermined lines or planes of separation, and in a superior manner, with more expedition and economy than has heretofore been possible.

Further objects of my invention comprise the provision of novel means for feeding and controlling the tubing while in the tube shearing machine.

For a better understanding of the nature, the scope and the characteristic features of my invention reference may now be had to the following description and the accompanying drawings, in which:

Figure 1 is a central longitudinal sectional view of a machine embodying my invention;

Fig. 2 is a portion of Fig. 1, enlarged;

Fig. 3 is a front elevational view of the machine with the cover plate and certain other parts removed;

Fig. 4 is a view similar to that of Fig. 3, but showing the working parts of the machine in a changed position;

Fig. 5 is a cross sectional view taken on the line 5—5 of Fig. 4;

Figs. 6 and 7 are vertical cross sectional views taken on lines 6—6 and 7—7, respectively, of Fig. 2;

Fig. 8 is a front elevational view of a portion of the machine embodying an adjustable tube feed gauge;

Fig. 9 is a sectional view taken on the line 9—9 of Fig. 8;

Figs. 10 and 11 are vertical cross sectional views taken on the lines 10—10 and 11—11, respectively, of Fig. 2;

Fig. 12 is a horizontal sectional view of a portion of the machine taken on the line 12—12 of Fig. 2;

Fig. 13 is a view of an arbor control valve shown as having the cover plate and handle removed;

Fig. 14 is an enlarged view, partly in section, of a portion of Fig. 1, showing the arbor control mechanism;

Figs. 15 and 16 are cross sectional views taken on the lines 15—15 and 16—16, respectively, of Fig. 14;

Figs. 17 and 18 are cross sectional views taken on the lines 17—17 and 18—18, respectively, of Fig. 1;

Fig. 19 is a perspective view of the adjustable arbor head; and,

Fig. 20 is a longitudinal sectional view of a fixed arbor and its related parts which, under certain circumstances, comprise a modified form of mechanism which may be substituted for the adjustable arbor shown in Figs. 1, 2 and 19.

The tube shearing machine embodying my invention and as here shown may consist generally of a frame 30 upon which a driving motor 31 is mounted. A fly wheel 32 is provided on the shaft of the driving motor, which shaft may also be connected through power transmission gearing 33 to the tube shearing mechanism at 34. The tube 35 which is to be sheared is positioned centrally of the machine and may be fed into place by the mechanism 36. An interiorly shearing element is indicated at 37, which element may be longitudinally adjusted and also expanded by the control mechanism at 38.

The power transmission gearing 33 may be of any well known form and its design is dependent upon the speed and power of the driving motor 31. In the form illustrated in Fig. 1, this gearing comprises three stages of speed-reduction gearing at 39, 40 and 41.

As best shown in Fig. 2, the main supporting frame 30 is provided centrally of its front face with a large hollow hub 42, which is fastened to the frame as by bolts 43. A housing 44 which encloses many of the moving elements of the exteriorly shearing mechanism is provided with a bearing sleeve extension 45 rotatable upon the hub 42. A normally constantly driven main gear 46 is journaled upon the bearing sleeve 45 and rotates thereon. As indicated in the drawings, suitable bearing bushings are provided at 47 and 48 for these rotatable elements.

Two exteriorly shearing dies are provided at 49 and 50. These dies may comprise flat annular members of hardened steel, with central openings of suitable size to receive the tubular member to be sheared. The die 49 is mounted in a die holder 51, which in turn is fixed by bolts 52 to the hub 42. The die 49 is therefore held stationary. The die 50 on the other hand, is supported by a mechanism, which will hereinafter be described, which mechanism initially holds the die 50 in a position to be substantially concentric with respect to the die 49. Furthermore, this mechanism, which is contained in the housing 44, serves to lock the die 50 against substantially all angular motion with respect to the axis of the tube to be sheared and yet permits non-rotational movement of the die, transversely of the tubular member that is being sheared. The mechanism about to be described serves to move the die 50 into a position eccentric to the tube to be sheared whereby the shearing action may be initiated, and such mechanism further serves to impart an orbital movement to the die whereby the shearing action may be continued around the wall of the tubular member along a circumferential line.

Particular reference will now be had to Figs. 2, 3, 6 and 7. The die 50 is fixed in an annular die holder 53. The die holder in turn is fixed within a keeper ring 54 and held therein by a plurality of clamps 55, as shown in Fig. 3. The clamps 55 serve to hold the die 50 and die holder firmly against the die 49.

Means will now be described whereby the keeper ring 54 is locked against rotational movement thereby locking the die 50 against such movement, but such means nevertheless being so made as to permit transverse or orbital movements. A coupling ring 56 may be interposed between the fixed die holder 51 and the keeper ring 54, such coupling ring being keyed respectively to the holder 51 and to the keeper ring along lines substantially at right angles to each other and extending radially from the die. As shown in Fig. 6, the die holder 51 is provided with horizontal keyways slidably engaged by keys 58 formed upon the coupling ring 56. The keeper ring 54 is provided with vertical extending keyways 59 (see Fig. 7), which are slidably engaged by keys 60 formed upon the face of the coupling ring 56. This arrangement of keys and keyways provides for the non-rotational transverse or orbital movements as above described.

As shown in Figs. 3 and 7, the keeper ring 54 is received between a pair of shoes 61, which are provided with suitable arcuate bearing surfaces as at 62, bearing against the periphery of the keeper ring 54. Each of the shoes may be provided with an oil pocket as at 63, which may be filled through the opening at 64. The bearing surfaces 62 may be perforated as at 65 to permit the oil to flow from the oil pockets to the bearing surfaces. The housing 44 is interiorly provided with guideways 66, upon which the shoes slide in a vertical direction (when the housing is in the position shown in Fig. 3).

As above stated, the housing 44 is adapted to be rotated and this rotational movement, together with the sliding movement of the shoes 61, permit the keeper ring 54 and die 50 to be given an orbital movement in the manner above described.

The mechanism for controlling the sliding movement of the shoes 61 will now be described. The shoes are in normal position as shown in Fig. 3, while in Fig. 4 they are shown in a position assumed while shearing action is taking place. As shown in Fig. 7, the shoes at their lower ends rest upon coil compression springs 67, which are received in pockets 68 formed in the housing 44. These springs serve to urge the shoes in an upward direction, (as viewed in Figs. 3 and 7). A cam 69 serves to force the keeper ring 54 and the shoes 61 downwardly at the desired times. The cam 69 is provided with two arcuate surfaces 70 and 71, which respectively bear against a shoe 72 and an adjustable wedge block 73. When the cam 69 is turned from the position shown in Fig. 7 to the position shown in Fig. 4, the die 50 together with the various parts holding the die, are moved to the eccentric position shown in Fig. 4. The die 50 may be adjusted to the concentric position by varying the height of the wedge block 73. To provide for this adjustment the wedge block 73 is surmounted by a pair of blocks 74 and 75, which may be drawn together or separated by a screw 76 having portions with oppositely directed threads as indicated for respectively engaging the blocks 74 and 75.

The block 75 is provided with a tongue portion 77, which is received by a correspondingly grooved portion of the block 74. The lower faces of the blocks 74 and 75, as well as the upper faces of the block 73, are formed at angles, as shown, whereby when the blocks 74 and 75 are drawn together, the wedge block 73 will be forced downwardly, thus adjusting the cam 69 downwardly against the force of the springs 67. The amount of eccentricity imparted to the die 50 by the action of the cam 69 may be limited by a set screw 78, which may be threaded into the wall of the housing 44. The set screw 78 limits the travel of the shoe 72 in a manner which will be readily understood. After the cam 69 has been actuated and returned again to the position shown in Fig. 7, the concentric position of the die 50 will be resumed because of the action of the springs 67.

In order to lubricate the surfaces 70 and 71 of the cam 69, as well as the bearing surface of the shoe 72 against the keeper ring 54, an oil pocket 79 is provided. This pocket is normally approximately one-half filled with oil and with each revolution of the housing 44 a quantity of oil is discharged through the outlet 80 into an oil line 81, which extends through the interior of the cam 69 from the outlet 80 to the surface at 71, then to the surface at 70, and finally through the shoe 72 to its bearing surface upon the keeper ring 54. The oil passage through the shoe 72 may have an elongated opening communicating with the passage through the cam through the movement thereof.

The means for actuating the cam 69 will now be described, particular reference being made to Figs. 2, 6 and 10. A cam operating member 82 is pivotally mounted at 83 in the housing 44. This cam operating member is provided with a locking arm 84 (see Fig. 6), which normally engages a slot 85 in the fixed die holder 51. The cam operating member is coupled to the cam 69 by a coupling member 86, which is keyed respectively to the cam and to the cam operating member in a manner very similar to the coupling member 56 above described. The cam operating member is formed with a keyway 87 which slidably receives the key 88 formed upon the coupling member. The cam 69 is formed with a keyway 89 (see Fig. 7), which is disposed at right angles to the keyway 87 and is adapted to receive a key 90 formed upon the coupling member. The coupling 86 permits the cam operating means to impart rotational movements to the cam even though the position of the cam is adjustable and also regardless of the fact that the center line of the cam operating member may not be concentric to the cam 69 in its various operating positions.

The cam operating member 82 is also provided with a cam restoring lug 91 (see Fig. 10), which is adapted to engage hardened steel pins 92 that are fixed adjacent the hub on the main gear 46.

By referring to Figs. 2, 6 and 10, means will now be disclosed for imparting the rotational movement to the housing 44. The housing 44 is provided with a boss 93 slidably receiving a pin 94 which is adapted to be received in notches as at 95 (see Fig. 10). The notches 95 are formed in hardened steel blocks 96, which form inserts in the hub portion of the main gear 46. The blocks 96 may be retained against radial displacement from the hub by means of pins, as at 97. The use of the steel blocks 96 is desirable since otherwise the cast iron, or other material of which the main gear may be formed, would be liable to wear or breakage at the points engaged by the pin 94.

When it is desired to rotate the housing 44 to initiate the shearing action, the pin 94 is made to engage one of the notches 95 by means of mechanism which will now be described. The pin 94 is attached by link member 98 (see Fig. 6) to a bell crank member 99 which is pivoted at 100 to an extension 101 of the housing 44. The extension 101 (see Fig. 3) is bolted as at 102 to the housing 44. This extension is provided with a lug 103 against which the bell crank 99 normally rests. A coil spring 104 adjustably fastened to a lug 105, which also is formed on the extension 101, tends to draw the bell crank 99 away from the lug 103, in order to raise the pin 94 into engagement with the notches 95.

However, a pin 106 normally restrains the spring 104 from accomplishing this result. The pin 106 is slidably received in a bracket 107, which in turn is bolted upon the frame of the machine. The pin 106 is normally urged into its raised position, as indicated in Fig. 6, by a spring 108. The pin 106, however, may be depressed against the force of spring 108 by means of a foot pedal 109, which is operatively connected to the pin 106 through the link 110 and a bell crank 111 and a pin 112, which act in a manner obvious from an inspection of Fig. 6. Accordingly, when it is desired to initiate the shearing action, the foot pedal 109 is depressed. This depresses the pin 106 thus permitting the bell crank 99, as drawn by the spring 104, to slip by this pin. The force exerted by the spring 104 thereupon raises the pin 94 into the next succeeding notch 95 that rotates into position over the pin 94. The main gear 46 normally continuously rotates in a clockwise direction, as viewed in Fig. 10.

The operation of the cam 69 and the cam operating member 82 may now be described in further detail. When the operator depresses the foot pedal 109, the entire housing 44 will commence to rotate by reason of the mechanism just described. Now since the cam operating member 82 is "locked" by reason of the arm 84 engaging notch 85 (see Fig. 6), the cam operating member will be forced to rotate within its bearing 83 since this bearing will rotate with the housing. The cam operating member will in this manner rotate until the arm 84 is drawn out of the notch 85 into the position shown by the dotted lines in Figs. 4 and 6. Meanwhile this rotation of the member 82 will have caused a rotation of cam 89 by reason of the action of the coupling member 86. The rotation of cam 89 as above stated will cause the die 50 to assume an eccentric position whereby the shearing action is initiated. The housing 44 will now continue to rotate through at least one complete revolution, or until the foot pedal 109 is again released to effect the withdrawal of the pin 94 from one of the slots 95.

When the pin 94 has been withdrawn from a slot 95, the housing will at once come to rest while the main gear 46 continues to rotate. Thereafter the next of the steel pins 92 which passes beneath the cam restoring arm 91 (see Fig. 10), will cause this restoring arm to move the cam operating member 95 in a counterclockwise direction, thus restoring the cam 69 to its initial position as in Fig. 3. Also the arm 84 will again engage the slot 85 thus "locking" the cam operating member for its next actuation.

An arrangement to compensate for the wear on the bearing sleeve or bushing 47 is provided in the form of a supporting block 113 resting upon a wedge block 114. The supporting block 113 has an arcuate upper surface 115 which is wedged against the lower side of the fixed die holding member 51. Screws 116 and 117 passing through the side walls of the housing 44 provide means for adjusting the position of the wedge block 114 and to thus securely retain the rotatable housing against vibration even though its bearings may become slightly worn. The supporting block 113 is formed with a tongue that fits into a corresponding groove in the wedge block 114 to prevent sidewise displacement during the adjusting operation.

The tube 35 which is to be sheared is slid over an arbor member 118 (see Fig. 19) and also over a continuation of the arbor comprising a pipe 119 which is attached by the screw threads at 120 to the arbor.

The pipe 119 is supported intermediate its ends by a roller 121 and at its rear end by the arbor control mechanism at 38. The end of the pipe adjacent the arbor during the operation of the machine is supported by the tube to be sheared which in turn is supported in the fixed die 49. When there is no tube in place to be sheared, the arbor 118 is suspended by reason of the stiffness of the pipe 119.

A pipe supporting roller 121 is rotatably mounted upon arms 122 which are pivotally mounted upon a shaft 123. The shaft 123 is mounted in brackets as 124, which in turn are attached to the two side frames 125. The side frames 125 comprise channel beams extending from the main frame of the machine 30 to the arbor control mechanism 38. The ends of the arms 122 opposite from the roller 121 are formed with weighted portions 126 which tend to swing the roller upwardly to support the pipe 119 or the tube 35 when the pipe is covered thereby at this point. Excessive upward movement of the roller 121 by reason of the action of the weighted portions 126 is prevented by stop lugs 127 formed upon the weighted portions and which will abut against set screws 128 which are adjustably mounted within the brackets 124.

An additional roller 129 is mounted in a frame 130 which in turn is pivoted as at 131 to each of the side frames 125. This roller provides an additional support for the tube 35 when it is of such length that it reaches over this roller. The roller 129 is adjustably held at the proper elevation by a set screw 132 mounted in a bracket 133. To accommodate tubes of various sizes, the set screw 132 is raised or lowered thereby adjusting the supporting roller 129 to the proper elevation.

The tube feeding mechanism at 36 will now be described. This mechanism permits the machine operator to advance the tube to be sheared to the various positions in order to shear off the desired lengths. A hand lever 134 is keyed to a rotatable shaft 135, which shaft is journaled in the main frame 30. A pair of levers 136 and 137 are also keyed to the shaft 135. The levers 136 and 137 are connected respectively through links 138 and 139 to pairs of toggle links 140 and 141. The toggle links in turn are pivotally connected to upper and lower gripping arm members 142 and 143 respectively. The upper gripping arm member 142 is mounted upon a shaft 144 and the lower gripping arm member is mounted upon a shaft 145. The shafts 144 and 145 are pivotally mounted in side links 146 and 147. This whole portion of the mechanism is suspended through a turn buckle connection 148 from a carriage 149 which rides upon a trackway 150. The trackway, as indicated in Fig. 1, is mounted within the main frame 30 and extends in a direction to permit the feeding mechanism to travel back and forth longitudinally of the tube which is being sheared. When the hand lever 134 is drawn forward as viewed in Fig. 11 a spreading apart of the toggle levers 140 and 141 will result. This spreading action turns the gripping arms upon their pivoting shafts 144 and 145 and causes the fingers as at 151 to grip the tube. Further forward movement of the hand lever 134 results in a forward movement of the entire feeding mechanism riding upon the carriage 149 along the track 150, the gripping arms serving at the same time to advance the tube 35 a corresponding amount. A rearward movement of the lever 134 tends to cause the toggle links 140 and 141 to collapse which results in a spreading of the gripping fingers 151 and the release of the tube 35. Further rearward movement of the lever causes the feeding mechanism to be drawn back to its initial position along the trackway 150.

Means will now be described whereby an adjustment of the spacing of the gripper arms 142 and 143 may be effected to accommodate various sizes of tubing. This means comprises segments as at 152 formed at the upper ends of the links 146 and 147, which segments cooperated with segments as at 153, which are pivoted upon pins 154. The pins 154, one of which is fixed at each end of the shaft 144 are pivotally mounted in the side links 146 and 147. The segments 153 are furthermore fixed at their lower ends by screws as at 155 to the ends of the shaft 144. It will be noted that the pins 154 are mounted eccentrically in respect to the shaft 144. Consequently, a rotational movement of the segments 153 in respect to the pins 154 will cause the shaft 144 to rotate eccentrically to the pins 154. Accordingly, by such rotation of the segments 153, the effective distance between shafts 144 and 145, as well as between the gripping arms, may be adjusted. When such an adjustment has been properly made to provide for a given size of tubing, the segments 153 may be fixed in respect to the segments 152 by the use of bolts or pins as at 156. These segments may be both provided with a series of openings arranged along the arc of a circle and the bolts or pins 156 may be extended through any corresponding two of these openings which happen to coincide after the adjustment is effected. If none of the corresponding openings on the pairs of segments exactly registers after the adjustment is made, then a slight turn of the segment 153 in either direction will bring two of the openings into the desired relative positions so that the bolts may be inserted.

In Figs. 8 and 9, a mechanism is shown for gauging the length of the portion of the tube which is to be sheared off. This mechanism includes a bracket 157 provided with bosses as at 158 through which bolts 159 extend to fix the bracket upon the ring 54. A shaft 160 is pivoted at 161 in the ring 54 and is also journaled in the bracket 157 at 162. A bracket arm 163 is rotatably mounted upon the shaft 160 and carries at its outer end an adjustable stop screw 164 provided with a yieldable head at 165 for abutting the end of the tube 35. The yieldable head comprises a cup shaped member 166 which is urged by a spring 167 in a direction toward the tube. A pin 168 passing through a slot 169 in the screw 164 serves to prevent the cup 166 from sliding off from the screw. The screw 164, as shown, is threaded for a considerable distance and provided with a lock nut 170 in order that it may be accurately and securely adjusted to accommodate various desired lengths of tubing.

A trip lever 171 is bolted to a ring 172 which in turn is pinned to the shaft 160. The trip lever 171 is adapted to engage a pin 173 which is fixed in a rotatable cover plate 174. The cover plate 174 forms a part of the housing 44 and is rotatable therewith.

The resilient head on the screw 164 normally rests at a height such that the screw engages the outer edge of the tubing 35. However, as soon as the shearing operation is initiated and the housing 44, together with the cover plate 174 are rotated, the pin 173 will engage the trip lever 171, thus turning the shaft 160 and bracket arm 163 and raising the stop screw 164 out of contact with the tubing 35. This trip arrangement permits easy removal of the severed piece of tubing. The rotational movement of the shaft 160, together with the bracket arm 163 and screw 164 may be limited by the engagement of a flattened portion 175 on the shaft 160 with the flange of the ring 54, as shown in Fig. 9. The stopping position of the screw 164 and arm 163 may be adjusted to various heights for different sizes of tubing by the use of a clamping arrangement shown at 176. This arrangement comprises a cap member 177 for the end of the shaft 160. The edge of the cap member, as well as the adjacent hub portion of the bracket arm, are provided with serrated surfaces at 178. The cap member is slotted at 179 to receive a pair of wedges 180 and 181, which also extend through a slot 182 in shaft 160. In order to adjust the angular position of the arm 163 upon the shaft 160 and to thus effect the desired adjustment of the height of the screw 164, the wedges 180 and 181 may be loosened. The bracket 163 may then be turned through the proper angle to the desired elevation and there fixed in relation to the shaft 160 by again tightening the wedges 180 and 181. The serrated edges at 178 enable the cap member 177 to engage and fix the bracket at the desired position. After the severed piece of tubing has been removed the weight of the screw 164 and the arm 163 will cause them to drop again into position to gauge the next length of tubing.

Means will now be described for guiding and for preventing distortion of the tubing while being sheared. This means is best illustrated in Figs. 2, 8 and 9, and comprises a guide ring 183 which is held in a keeper 184 which in turn is secured by a plurality of bolts as at 185 to a ring 186. The cover plate 174 is provided with an annular bearing surface at 187 which retains the ring 54 against outward movement. This portion of the cover plate also as shown in Fig. 9 serves to hold the ring 186 in a position concentric with the shearing dies and against outward movement. However, the ring 186, the keeper 184 and the guide 183 constitute a floating unit held against rotation only by contact between the hook shaped projection 188 and the boss 158 of the bracket 157. For tubing of various diameters corresponding sizes of guide rings 183 may be used. To facilitate the changing of the guide rings, the keeper 184 at the points of engagement by the bolts 185 is provided with the hook shaped or slotted bosses as at 188. To remove the keeper ring and the guide therein, the bolts 185 are loosened and the parts may then be readily removed after a slight turning movement in a counter-clockwise direction.

The mechanism at 38 and the associated parts comprising the internal shearing elements will now be described, particular reference being made to Figs. 1, 14, 15 and 16. The arbor head 118 (see Fig. 19) is of a substantially cylindrical shape, provides the interior cutting or shearing edge, is formed with a plurality of radial slots as at 189, and is bored out at 190 to permit an expander head 191, together with an expander head rod 192 to extend therethrough. The outer end 193 of the arbor head 118 is enlarged sufficiently to loosely fit the inside of the tubing to be sheared by the cutting edge of the head 118 and the bore 190 at this enlarged end is outwardly tapered to accommodate the tapered expander head 191. By means of the expander head 191, the arbor 118 may be expanded to tightly fit the inside of the tubing while being sheared, the slots 189 serving to divide the arbor into a plurality of yieldable sections which may be flexed sufficiently to enlarge the outside diameter of the arbor to the desired extent. The expander head rod 192 is connected by a pin 194 at a knuckle joint 195 to a pull rod 196, which extends through the pipe 119 to the mechanism at 38.

The mechanism at 38, as previously stated, comprises means whereby the arbor head 118 may be expanded and also means for adjusting the longitudinal position of the arbor with respect to the shearing dies. The pipe 119 extends into the mechanism 38 and is rotatably mounted in a head piece 197, which is provided with a forked extension 198 at its base. The extension 198 is provided with a screw 199 for engaging a cross piece 200 of the stand 201. The stand 201 is provided with upwardly extending braces 202 attached to the side frames 125. The braces 202 serve to retain the head piece 197 in an upright position. The screw 199 is fixed against longitudinal movement in respect to the forked extension 198 by collars 203 and 204 which are pinned to the screw. The screw is threaded into the cross piece 200 and may be longitudinally adjusted therein. By adjusting the screw 199, the pipe 119 is longitudinally adjusted since this pipe is fixed against longitudinal movement in respect to the head piece 197 by collars 205 and 206, which are pinned to the pipe. Accordingly, the adjustment of the screw 120 serves to longitudinally adjust the arbor head 118 which is fixed to the pipe 119. This adjustment serves to determine the circumferential line along which the internal shearing action takes place at the end of the arbor head 118. This adjustment of the screw 199 may be made from the front of the machine by turning the screw 207 (see Fig. 3) which is connected to the screw 199 through the medium of various connecting shafts 208 (see Fig. 1), which are suitably journalled and provided with universal joints as shown. The above described mechanism comprises the arbor adjusting means.

The means for expanding the arbor head will now be described. An air cylinder 209 is provided with a piston 210 and a toggle mechanism, as shown in Figs. 14, 15 and 16 for longitudinally shifting the above described rod 196 in respect to the pipe 119. A piston rod 211 is pivotally connected at 212 to connecting links 213 and 214. The link 214 is pivotally connected with a pair of levers 215 and 216 (see Fig. 16). A cross head 217 rotatably mounted upon the pipe 119 is provided with pintles at 218 and 219, upon which the levers 215 and 216 are respectively pivoted intermediate their ends. The upper ends of the levers 215 and 216 are pivoted to a connecting link 220, which in turn is slotted at 221 intermediate its ends for providing a loose pivotal mounting upon the head piece 197. The cross head 217 although rotatably receiving the pipe 119 is restrained against longitudinal movement thereon by a collar 222 pinned to the pipe 119 and a thrust bearing 223 interposed between the collar and the cross head.

The link 213 is pivotally connected to levers 224 and 225, the upper ends of which are pivoted to the rear end of the connecting link 220. A cross head 226 is pivotally mounted upon pintles journalled in the levers 224 and 225 in a manner similar to the mounting of the cross head 217 above described. The cross head 226, however, is secured to the rod 196 on a reduced end 227 thereof by nuts 228 and is furthermore held in proper alignment by being slidably mounted on pins 229 and 230. These pins are secured in the head piece 197 in any suitable manner as by being driven into openings with a tight fit.

The air cylinder 209 is controlled by a two way valve 231 (see Figs. 11 and 13) which, as shown, is conveniently located at the front portion of the machine. This valve will permit air from any suitable supply to flow into the cylinder 209 either above or below the piston as desired. As shown in Fig. 13, the valve may comprise a cylindrical casing 232 enclosing a rotatable valve member 233 provided with a pair of ports 234 and 235. The opening 236 may lead to the source of air supply while the opening 237 leads to the portion of the cylinder above the piston 210 and the opening 238 to the lower portion of the cylinder. Openings at 239 and 240 to the atmosphere may be provided. With this valve it will be seen that the source of supply may be directed to either the upper or the lower portions of the cylinder. The portion of the cylinder to which air is not being admitted will at the same time be opened to the atmosphere to permit exhaustion of any air pressure therefrom. In this manner air pressure can be controlled to move the piston 210 either upwardly or downwardly.

As shown in Fig. 14, the piston 210 is at the top of the cylinder 209 which is the position taken when the expander head 191 is drawn into the arbor. The arbor is then expanded and in condition for the shearing operation to take place. If air is now admitted to the upper portion of the cylinder, the piston will travel downwardly and thus tend to collapse the toggle mechanism above described, bringing the levers 215 and 225 closely together. Since the levers 215 and 225 are pivoted at a longitudinally fixed point in respect to the pipe 119, the levers 215 and 225, including their pivoting points and the cross head 226, will be drawn toward the front of the machine. This in turn will move the rod 196 in a direction to release the expander head 191 from its operating position. In order to again replace the expander head in operating position and to expand the arbor head, air is admitted to the lower portion of the cylinder 209, which results in the expansion of the toggle lever mechanism. This draws the pull rod 196 in a direction to pull the expander head into the arbor.

This mechanism enables the operator to very quickly release the expansible arbor head from engagement with the interior walls of the tubing after each shearing operation. The expansible arbor head herein described suffices to compensate for variations of the internal diameters of the tubing. Variations from the ideal standard sizes of the tubing are oftentimes quite pronounced, especially in tubing of large diameter. With small tubing, which may have a more uniform internal diameter, a fixed form of arbor may be employed with good results.

A form of fixed arbor construction is shown in Fig. 20 and may consist of an arbor head 241 which is secured by nut 242 to a stud 243. The stud 243 may be received in a pipe 244 corresponding to the pipe 119, above described. Tube supports 245 may be mounted on the pipe 244 and spaced apart a desirable distance by a spacer sleeve 246. Means for supporting and longitudinally adjusting the rear end of the pipe 244 are illustrated at 247. This means is very similar to the form used in connection with the expansible arbor head, already described and further description thereof is not necessary. When it is desirable to shear tubes of different sizes, then different sizes of fixed arbors are necessary and consequently means are provided for the ready separation of the fixed arbor from the longitudinally adjusting mechanism, the adjusting mechanism being suitable for all sizes of fixed arbors. This separable connection may comprise a spring pressed holding sleeve 248 sliding over a stud 249, which stud in turn is connected by a length of pipe 250 to the longitudinally adjusting mechanism 247. The stud 249, together with a stud 251 fixed in the pipe 244 are provided with a hook joint 252 which is normally covered by the sleeve 248. To effect disengagement at the hook joint 252, the spring pressed sleeve 248 is merely withdrawn against the pressure of a spring 253. A centering collar 254 is provided on the pipe 244 in order to hold tubing which may be of considerable length and to prevent any excessive strain on other parts of the mechanism.

While I have shown and described certain preferred embodiments of my invention, it will be understood that I do not desire to limit the scope of my invention except as may be necessitated by the prior art and as defined in the following claims.

Having thus described my invention, what I claim as new and desire to secure by Letters Patent of the United States, is:

1. The method of transversely severing a metallic tubular member in twain along a line of separation, which consists in subjecting said member to opposed coacting non-rotary inner and exterior cutting edges that lie in the plane of separation, and then through the medium of relative revoluble movement between the tubular member and the cutting edges to progressively shear the said member.

2. A machine for shearing a circular tubular member along a circumference of separation, which comprises an arbor provided with a cutting edge, means for rendering said arbor accessible in order that a circular tubular member to be sheared may embrace the same, a shear-ring exteriorly of said arbor and adapted to embrace said circular tubular member, said shear-ring being locked against rotary motion, and means for imparting an orbital movement to said shear-ring thereby progressively shearing said tubular member along the circumference of separation.

3. A machine for shearing a circular tubular member along a circumference of separation which comprises an arbor provided with a cutting edge, means for rendering said arbor accessible in order that a circular tubular member to be sheared may embrace the same, a shear-ring exterior of said arbor and adapted to embrace said circular tubular member, said shear-ring being locked against rotary motion, and means for imparting a revoluble motion to said shear-ring about the said arbor in order that its cutting edge may successively engage the segments of the periphery of said tubular member along the circumference of separation to effect progressive shearing of the tubular member.

4. In a machine for transversely shearing a tubular member with a clean cut, the combination with a cutting element having a cutting edge that is adapted to interiorly engage the tubular member to be sheared, of a second coacting cutting element locked against rotary motion and having a cutting edge that is adapted to exteriorly engage said tubular member oppositely to said interior cutting edge, and means for imparting a revoluble motion to said second cutting element in order to simultaneously engage said interiorly and exteriorly cutting and opposed edges with said tubular member along the same plane of separation to shear said tubular member.

5. In a machine for shearing a circular tube, the combination with a cutting element having a circular cutting edge that is adapted to interiorly engage the tube, of a second cutting element locked against rotary motion and having a circular cutting edge juxtaposed to said first cutting edge and adapted to exteriorly engage said tube, and means whereby said second cutting element is revolved relative to said tube and said interior cutting element to simultaneously engage the interior and exterior surfaces of the walls thereof along the circumference of separation in order to transversely shear said tube.

6. A machine for shearing tubular members comprising exteriorly and interiorly shearing elements, means for locking said exteriorly shearing element against substantially all angular motion in respect to the axis of said interiorly shearing element, and means for imparting an orbital movement to said exteriorly shearing element eccentrically to said interiorly shearing element.

7. In a machine for shearing tubular members, the combination with a cam housing, means for rotating said cam housing, of cam actuated means slidingly engaging said housing, a shearing element secured to said cam actuated means, and means permitting said cam actuated means to move transversely with reference to said housing and precluding said cam actuated means from rotating therewith.

8. In a machine for shearing tubular members, the combination with an interiorly shearing element, and a rotatable cam housing, of cam actuated means slidingly engaging said housing, an exteriorly shearing element secured to said means, and means for adjusting one of said shearing elements eccentrically of the other of said shearing elements.

9. In a machine for shearing tubular members, the combination with an interiorly shearing element, and a rotatable cam housing, of cam actuated means slidingly engaging said housing, an exteriorly shearing element secured to said means, and means for adjusting said exteriorly shearing element eccentrically of said interiorly shearing element.

10. In a machine for shearing tubular members, the combination with an interiorly shearing element, and a rotatable cam housing, of cam actuated means adapted to slidingly engage said housing, an exteriorly shearing element secured to said means, means for adjusting said exteriorly shearing element eccentrically of said interiorly shearing element, and means precluding the rotation of said cam actuated means with said housing and permitting said cam actuated means to move transversely relative to the axis of rotation of said housing.

11. In a machine for operating upon tubular members, an element for interiorly engaging the tubular members undergoing operation, a rotatable cam housing, cam actuated means enclosed in and adapted to slidingly engage with said housing, and means to adjust said cam actuated means transversely of said interiorly engaging element, an element secured to the cam actuated means for exteriorly engaging the tubular member undergoing operation, means for initially positioning said cam actuated means in said cam housing in order to hold said exteriorly engaging element out of contact with the tubular member undergoing operation, but subsequently effecting engagement between said exteriorly engaging element and the tubular member, and means for holding the cam actuated means against rotation when said cam housing rotates.

12. A machine for shearing tubular members comprising an interiorly shearing element, an exteriorly shearing die member, and means for fixing said die member against rotation in respect to said interiorly shearing element, said means comprising a coupling permitting transverse movement of said member in respect to said element.

13. A machine for shearing tubular members comprising an interiorly shearing element, an exteriorly shearing die, a die holder therefor, means for retaining said die holder against rotational movement in respect to the interiorly shearing element, said means comprising a support positioned in opposed relation to said die holder and a coupling ring interposed between and keyed respectively to said support and to said die holder along lines substantially at right angles to each other and extending substantially radially from said die, whereby non-rotational movement of said die holder is permitted transversely of the tubular member being sheared.

14. A machine for shearing tubular members comprising an interiorly shearing element, an exteriorly shearing die member, means for fixing said member against rotation in respect to said interiorly shearing element, said means comprising a coupling permitting transverse movement of said member in respect to said element, and means for imparting an orbital movement to said die member in respect to said interiorly shearing element.

15. A machine for shearing tubular members comprising an interiorly shearing element, an exteriorly shearing die, a die holder therefor, means for retaining said die holder against rotational movement in respect to the interiorly shearing element, said means comprising a support positioned in opposed relation to said die holder and a coupling ring interposed between and keyed respectively to said support and to said die holder along lines substantially at right angles to each other and extending substantially radially from said die, whereby non-rotational movement of said die holder is permitted transversely of the tubular member being sheared, and means for imparting an orbital movement to said die in respect to said interiorly shearing element.

16. In a machine of the class described, a die member fixed against rotation, means for imparting an orbital movement within a plane to said member, said means comprising shoes for embracing said member, said shoes being slidable in a direction parallel to said plane, supporting means for slidably mounting said shoes, and means for rotating said supporting means.

17. A machine for shearing tubular members comprising exteriorly and interiorly shearing elements that are initially substantially concentric, means for locking said exteriorly shearing element against substantially all angular motion in respect to the axis of said interiorly shearing element, means for moving said exteriorly shearing element to be eccentric to said interiorly shearing element whereby the shearing action may be initiated, and means for imparting an orbital movement to said exteriorly shearing element whereby the shearing action may be continued around the wall of the tubular member.

In witness whereof, I have hereunto subscribed my name.

WALTER E. AMBERG.